US009881370B2

(12) United States Patent
Printemps et al.

(10) Patent No.: US 9,881,370 B2
(45) Date of Patent: Jan. 30, 2018

(54) METHOD OF DETERMINING A ROTATION AXIS OF AN OBJECT IN TOMOGRAPHY AND CHARACTERISATION METHOD BY TOMOGRAPHY

(71) Applicant: Commissariat a l'energie atomique et aux energies alternatives, Paris (FR)

(72) Inventors: Tony Printemps, Grenoble (FR); Pierre Bleuet, Seyssins (FR)

(73) Assignee: Commissariat a l'energie atomique et aux energies alternatives, Paris (FR)

(*) Notice: Subject to any disclaimer, the term of this patent is extended or adjusted under 35 U.S.C. 154(b) by 57 days.

(21) Appl. No.: 15/015,676

(22) Filed: Feb. 4, 2016

(65) Prior Publication Data
US 2016/0232662 A1 Aug. 11, 2016

(30) Foreign Application Priority Data
Feb. 5, 2015 (FR) .................................. 15 50905

(51) Int. Cl.
*G06K 9/00* (2006.01)
*G06T 7/00* (2017.01)
*G06T 11/00* (2006.01)
*G06T 7/32* (2017.01)

(52) U.S. Cl.
CPC .............. *G06T 7/0012* (2013.01); *G06T 7/32* (2017.01); *G06T 11/005* (2013.01); *G06T 2207/10081* (2013.01); *G06T 2211/424* (2013.01); *G06T 2211/436* (2013.01)

(58) Field of Classification Search
None
See application file for complete search history.

(56) References Cited

U.S. PATENT DOCUMENTS

| 2008/0123995 A1* | 5/2008 | Yin | G06T 7/37 |
| | | | 382/294 |
| 2014/0072102 A1* | 3/2014 | Bleuet | G21K 7/00 |
| | | | 378/62 |
| 2014/0307934 A1* | 10/2014 | Batenburg | G06T 11/005 |
| | | | 382/131 |
| 2016/0232662 A1* | 8/2016 | Printemps | G06T 7/0012 |

(Continued)

FOREIGN PATENT DOCUMENTS

EP 2 770 480 A1 8/2014

OTHER PUBLICATIONS

U.S. Appl. No. 14/021,367, filed Sep. 9, 2013, 2014/0072102 A1, Pierre Bleuet, et al.

(Continued)

*Primary Examiner* — Tahmina Ansari
(74) *Attorney, Agent, or Firm* — Oblon, McClelland, Maier & Neustadt, L.L.P.

(57) ABSTRACT

Method of determining a rotation axis of an object during acquisition of projections obtained by a tomography characterization system, comprising the following steps, starting from said projections:
  Select zones on the projections along the presumed rotation axis;
  Reconstruct a structure of the object using data in the selected zones,
  Make reprojections of the reconstruction;
  Determine a total offset for each selected zone;
  Determine the real rotation axis using total offsets determined for all zones.

19 Claims, 7 Drawing Sheets

(56) References Cited

U.S. PATENT DOCUMENTS

2016/0371863 A1* 12/2016 Simon .................. G06T 11/006

OTHER PUBLICATIONS

French Preliminary Search Report dated Dec. 22, 2015 in French Application 15 50905 filed on Feb. 5, 2015 (with English Translation of Categories of Cited Documents).
Heiko Stegmann, et al., "Characterization of barrier/seed layer stacks of Cu interconnects by electron tomographic three-dimensional object reconstruction", Microelectronic Engineering, vol. 65, (1-2), 2003, 14 pgs.
Cedric Messaoudii, et al, "TomoJ: tomography software for three-dimensional reconstruction in transmission electron microscopy", BMC Bioinformatics, vol. 8, (1), 2007, 9 pgs.
A. Bartesaghi, et al., "Classification and 3D averaging with missing wedge correction in biological electron tomography", Journal of Structural Biology, vol. 162, (3), 2008, 15 pgs.
Daniel Wolf, "Accurate tilt series alignment for single axis tomography by sinogram analysis", Triebenberg Laboratory, Institute of Structure Physics, 2015, 2 pgs.

* cited by examiner

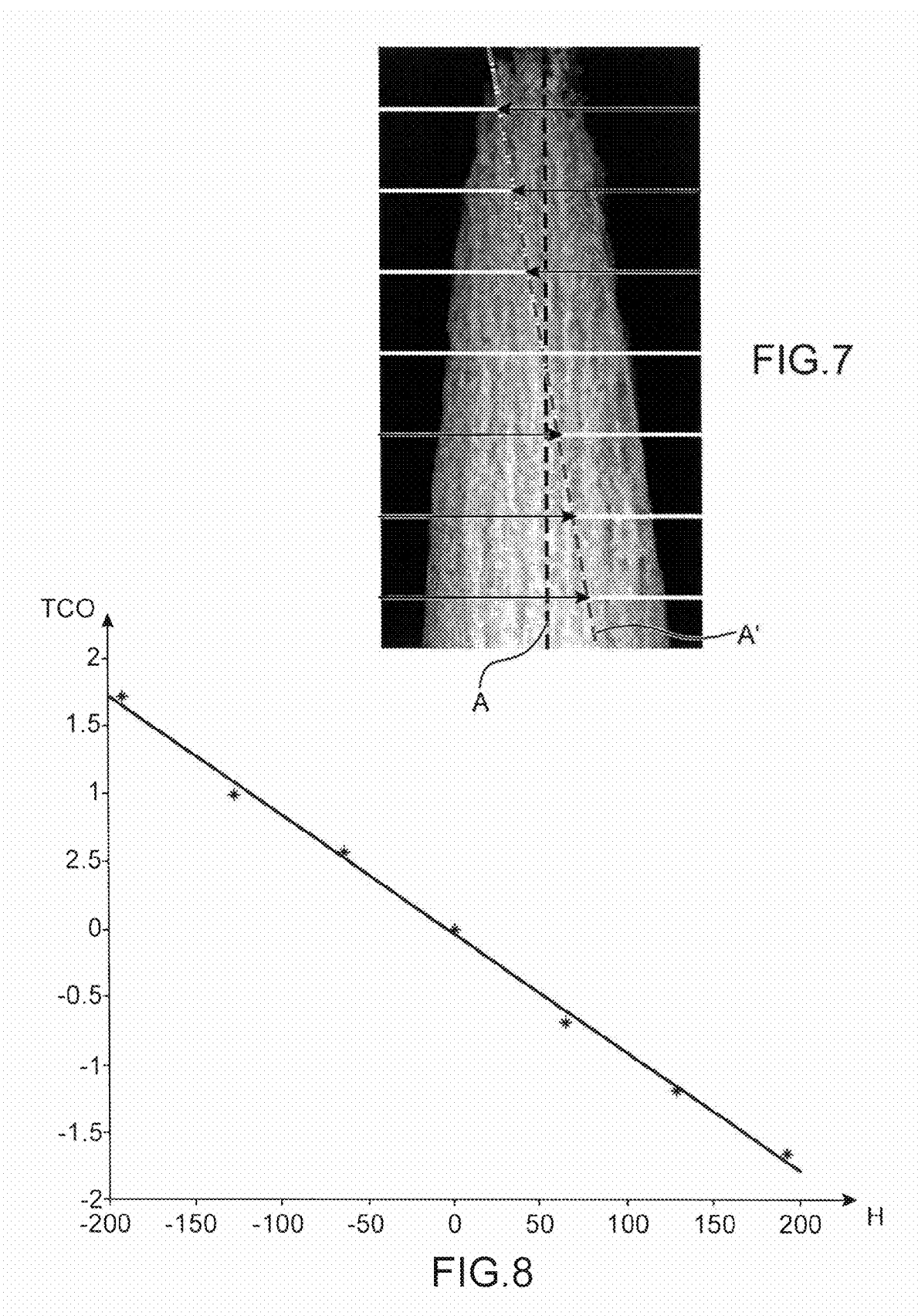

METHOD OF DETERMINING A ROTATION AXIS OF AN OBJECT IN TOMOGRAPHY AND CHARACTERISATION METHOD BY TOMOGRAPHY

TECHNICAL DOMAIN AND STATE OF PRIOR ART

This invention relates to a method of determining a rotation axis of an object in tomography and a method of characterising an object by tomography making use of such a method.

Tomography, for example electronic tomography, is a characterisation technique routinely used to obtain a three-dimensional image of the structure of an object for which the dimensions may be about a hundred nanometers, with a resolution of about one nanometer.

This technique comprises:
- the acquisition step of a series of 2D images called projections, obtained using a transmission electron microscope from an object that is rotated about an axis, ideally about 180°. The projections are taken for example at a step of between 1° and 5°;
- the projection alignment step;
- the digital reconstruction step of the object in three dimensions.

Increasing interest is being shown in electron tomography, particularly in a context of continuously increasing miniaturisation and complexity of electronic components. Nevertheless, this technique is limited by the amount of work necessary for it. It requires very careful preparation of the sample and image acquisition steps with the microscope, alignment of data and 3D reconstruction using an algorithm.

In order to obtain satisfactory reconstruction, reconstruction algorithms require a perfect knowledge of the rotation movement of the object during acquisition of the projections. Conventionally, algorithms reconstruct the object in 3D from projections of an object with a pure rotation movement about a vertical axis, which is the axis of the sample holder of the tomography characterisation system, the projection of which is at the middle of the 2D images. This is an ideal case that hardly ever occurs. The rotation axis may be tilted from the vertical direction in a plane parallel to the electron beam and/or tilted relative to the vertical direction in a plane perpendicular to the electron beam.

Rotation of an object at this scale will cause displacement of the object over several nanometers or even tens of nanometers or even hundreds of nanometers from one image to the next. Furthermore, the rotation axis is not completely known and an inaccuracy even of the order of one degree can have major consequences on the quality of the 3D reconstruction.

In particular, arc-shaped artefacts may occur on the reconstructed sectional views.

Techniques are available to reduce these arc-shaped artefacts.

One technique used is a technique for alignment of projections by correcting the offset between one projection and the next by cross-correlation calculations. Translations along the two directions in space are thus corrected between succeeding images. Once the translations have been corrected using this method, the rotation axis is usually determined by visually minimising arc-shaped artefacts on a few sections reconstructed at the centre and on the ends of the object. For example, these conventional alignment methods are methods used in the Inspect 3D software marketed by the electron microscope manufacturer FEI.

Therefore this technique for determining the rotation axis requires the operator to make a visual estimate of the reconstruction quality. This may be relatively easy on reconstructions with many details such as porous silicon, but it may be much more difficult on objects without many details, particularly at the ends. Furthermore, the maximum precision that can be obtained is of the order of one degree. Furthermore, the quality of the determination of the rotation axis depends on the expertise of the operator and the sections used to evaluate the artefacts.

Another technique is disclosed in D. Wolf, "Accurate tilt series alignment for single axis tomography by sinogram analysis," in Proceedings of the 15th European microscopy Congress, 2012. This technique aligns the rotation axis and translations at the same time along the two directions in space. The technique consists of choosing three sinograms, one at the top, one in the middle and one at the bottom of the projections.

The centre of gravity of the sinograms is calculated and sinusoidal interpolations of these three centres of gravity are made. If the rotation axis is not perfectly centred and vertical, the centres of gravity of the sinograms are offset from their sinusoid by a constant for sinograms at the top, middle and bottom.

Translations and the rotation axis are aligned by rotating and translating the projections in an iterative method, in an attempt to minimise the constants.

This technique has the advantage that it does not depend on the operator's expertise. However, it is very sensitive to diffraction that may occur on an object with crystalline parts. Diffraction then has the effect of increasing the intensity of a part of the object on some projections corresponding to a crystal diffraction angle relative to the electron beam. This increase in intensity can cause an offset in the determination of the centre of gravity and then distort the alignment. Furthermore, this technique makes it necessary to interpolate the data using a sinusoid, and this is not necessarily robust with noisy data.

PRESENTATION OF THE INVENTION

Consequently, one purpose of this invention is to provide a method for determining the rotation axis of the object to be imaged by tomography and an imagery method by tomography providing better quality reconstructed images.

The purpose mentioned above is achieved by a method for determining the rotation axis of the sample including the following steps:
- select a data subgroup comprising one line or several lines in each projection, along the presumed rotation axis, this subgroup being located at a given position along the presumed rotation axis corresponding to a height on the sample;
- make a reconstruction from the data;
- reproject the reconstruction;
- determine the offset for the selected subgroup between projections and reprojections;
- these reconstruction/reprojection steps are repeated to obtain an offset according to a given criterion. The offset obtained is a translation offset at the height of the selected subgroup.

Several subgroups are selected at different heights and the translation offset is determined for each subgroup.

Then, knowing the translation offsets at several heights along the presumed rotation axis, the real rotation axis can be determined by translating and/or pivoting the presumed rotation axis of each projection.

In order to reconstruct the structure of the object, it may for example be possible to either correct the rotation axis on each projection and make the reconstruction from corrected projections, or to take account of the real rotation axis in the reconstruction algorithms.

The above steps can be used to correct a tilt and/or an offset of the rotation axis in a plane perpendicular to the direction of the electron beam. On the other hand, they cannot correct a tilt and/or offset in a plane parallel to the direction of the electron beam. In this case, the translation and/or the offset in a plane parallel to the direction of the electron beam is corrected before the above steps, using known techniques such as cross-correlation techniques between successive projections or "Common Line" techniques, but this list is not exhaustive.

In other words, by carrying out successive reconstruction/reprojection steps for data at various projection heights, the offset between the rotation axis used for the first reconstruction and the real rotation axis or a rotation axis approaching the real rotation axis, is determined.

The correction technique according to the invention may be very robust, for example by using a robust reconstruction algorithm such as the Simultaneous Iterative Reconstruction Technique (SIRT) with 100 iterations, for example with a positivity constraint, in order to obtain a precise determination of optimum common translations.

Advantageously, an even more robust technique can be obtained by using a number of subgroups and very advantageously 7 subgroups at distinct projection locations, so as to make a reliable linear interpolation and to limit risks of imprecision.

This technique is also very fast, for example it only takes a few tens of seconds to a few minutes when it is used by a computer in which a graphic card is installed.

The offset between projections and reprojections is determined for example by cross-correlation. Contours or an intermediate reconstruction element that is shown on the projections could be used as a variant.

The subject-matter of this invention is then a method of determining the rotation axis of an object during acquisition of projections obtained by a tomography characterisation system, comprising the following steps, starting from said projections:

a) choose a presumed rotation axis on the projections;
b) select a first zone on the projections along the presumed rotation axis;
c) reconstruct a structure of the object using data in the selected zone starting from all or some of the projections considering the presumed rotation axis;
d) make reprojections of the reconstruction;
e) determine offsets between the projections and reprojections;
f) determine a common offset using the offsets determined in step e);
g) apply the common offset to the selected zone over all or some of the projections;
h) repeat steps c) to g), the reconstruction step c) being made from projections obtained in step d), until a stop criterion is reached;
i) determine a total offset from the common offset(s) determined in step f) or steps f);
j) repeat steps a) to i) for n other zones distinct from the first zone, where n is greater than or equal to 1;
k) determine the rotation axis using total offsets determined for the n+1 zones.

Steps c) and d) are advantageously made using the same projector.

n is preferably greater than or equal to 2 and advantageously equal to 6.

Step c) advantageously makes use of a simultaneous iterative reconstruction method (SIRT) advantageously comprising 100 iterations with a positivity constraint.

Step e) may also advantageously be done by cross-correlation.

Step k) may also advantageously be done by linear extrapolation using total offsets.

According to an additional characteristic, the determination of a common offset may include the step to determine a mean offset using offsets determined in step e), the common offset being equal to a coefficient $\lambda$ multiplied by the mean offset, where $\lambda$ is greater than 0.

The value of the coefficient $\lambda$ may preferably reduce during iterations, since the coefficient $\lambda$ is initially advantageously equal to 10.

For example, the stop criterion may be either:
  only a number of iterations of steps c) to g);
  only a value of the last common offset less than a given value;
  either a number of iterations in steps c) to g) or a value of the last common offset less than a given value, whichever is reached first.

Preferably, the method comprises the projection alignment step before the reconstruction step, for example by cross-correlation.

Selected zones may comprise one or several rows of pixels.

Another subject-matter of this invention is a tomography characterisation method comprising the following steps:

A) Acquisition of several projections;
B) Determination of the real rotation axis of the object by applying the method according to the invention;
C) Use the real rotation axis to reconstruct the structure of the object making use of a reconstruction algorithm.

According to one example, step C) includes the correction of projections with the real rotation axis, before the reconstruction.

According to another example, step C) includes integration of corrections into the reconstruction algorithm before the reconstruction.

Step A) is made for example by electron tomography or by X-ray tomography.

BRIEF DESCRIPTION OF THE DRAWINGS

This invention will be better understood after reading the following description and the appended drawings on which:

FIG. 7 is a projection of a porous silicon sample on which the presumed rotation axis and the corrected rotation axis are shown;

FIG. 8 is a graphic representation of calculated experimental values of seven optimum common translations as a function of the height in pixels along the presumed rotation axis and of the corresponding linear interpolation;

DETAILED PRESENTATION OF PARTICULAR EMBODIMENTS

The following terms used in the description are defined below:
projections: 2D images obtained by a transmission electron microscope;
intermediate reconstruction: 3D image reconstructed by an algorithm from projections or reprojections;
reprojections: 2D images obtained from the reconstructed 3D image;
group of projection data: data derived from a projection or reprojection at a given height along the presumed rotation axis, this group possibly comprising one or several lines;
presumed rotation axis: the vertical rotation axis at the centre of the projections, denoted A;
real rotation axis: the rotation axis determined by the method according to the invention, denoted A'.

In the example that will be described, the sample is pivoted relative to the source and to the detector. In another example, the source and the detector could be free to move and the sample could be fixed.

Figure 9:
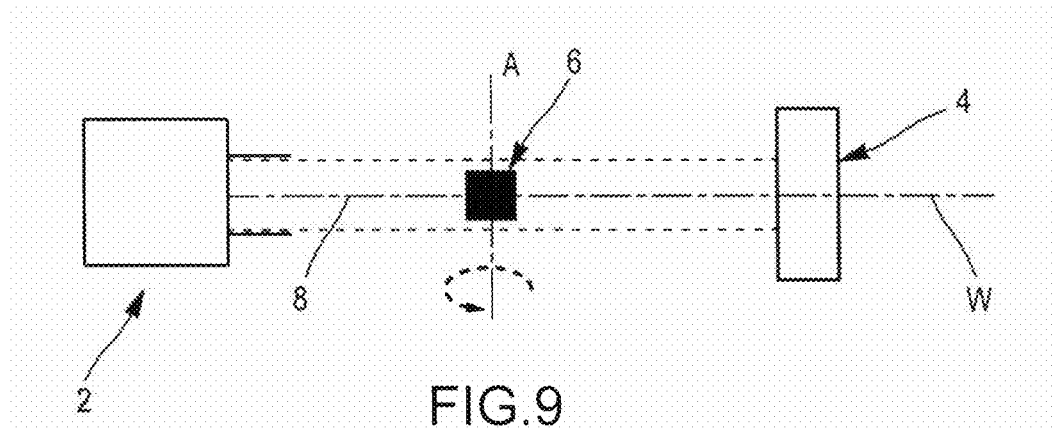
FIG. 9 is a diagrammatic view of a tomography imagery device capable of implementing the imagery method according to the invention.

FIG. 9 diagrammatically shows a tomography system comprising an X-ray or electron source 2 with axis W, a detector 4 and a sample holder 6 located between the source 2 and the detector such that the sample is located on the path of the beam 8 transmitted by the source 2. The beam 8 is symbolised by a dashed line.

In the case of an electron source, detectors are of the transmission type like those used in transmission electron microscopy (TEM) or STEM (Scanning Transmission Electron Microscopy). In the case of an X-ray source, the detectors used are those conventionally used in λ radiography and λ tomography.

The sample holder 6 is such that it can pivot about an axis denoted A. In the example shown, the axis A is vertical.

Reconstruction algorithms need to know the rotation axis to reconstruct the 3D structure from the projections. The algorithms assume that the rotation axis on the projections is located in the middle of the projection and is vertical.

Figure 10A:
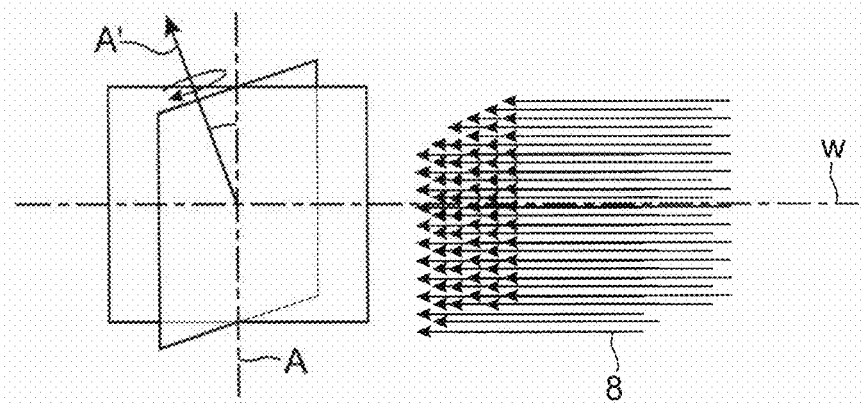
FIG. 10A is a diagrammatic view of a tilted rotation axis that can be determined by the method according to the invention.
Figure 10B:
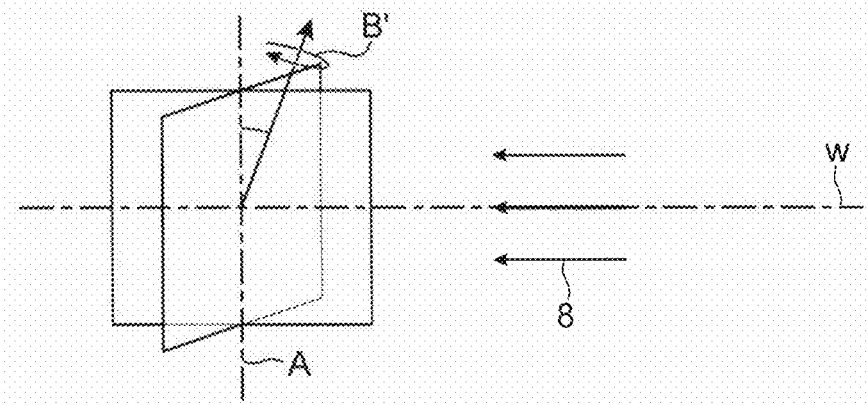
FIG. 10B is a diagrammatic view of a tilted rotation axis that cannot be determined by the method according to the invention.

FIG. 10A diagrammatically shows the electron beam 8 and a rotation axis A' for which the orientation can be detected by means of the method according to the invention. The rotation axis A is tilted relative to the vertical in a plane perpendicular to the direction of the beam 8. FIG. 10B, diagrammatically shows the electron beam 8 and a rotation axis B' for which the orientation cannot be detected using the method according to the invention. The rotation axis B' is tilted relative to the vertical in a plane parallel to the direction of the beam 8. Nevertheless, a component in a plane parallel to the axis of the beam has much less influence on the reconstruction than a non-null component along the direction perpendicular to the beam.

The method of determining the rotation axis of the sample to be imaged by tomography comprises several steps including the step to prepare the sample to be imaged and the step to acquire projections of the sample.

The sample is preferably in the shape of a tip.

The sample is for example prepared as a tip by means of a focus ion beam (FIB). Preparation of a tip-shaped sample is known to those skilled in the art and will not be described in detail.

Figure 1:
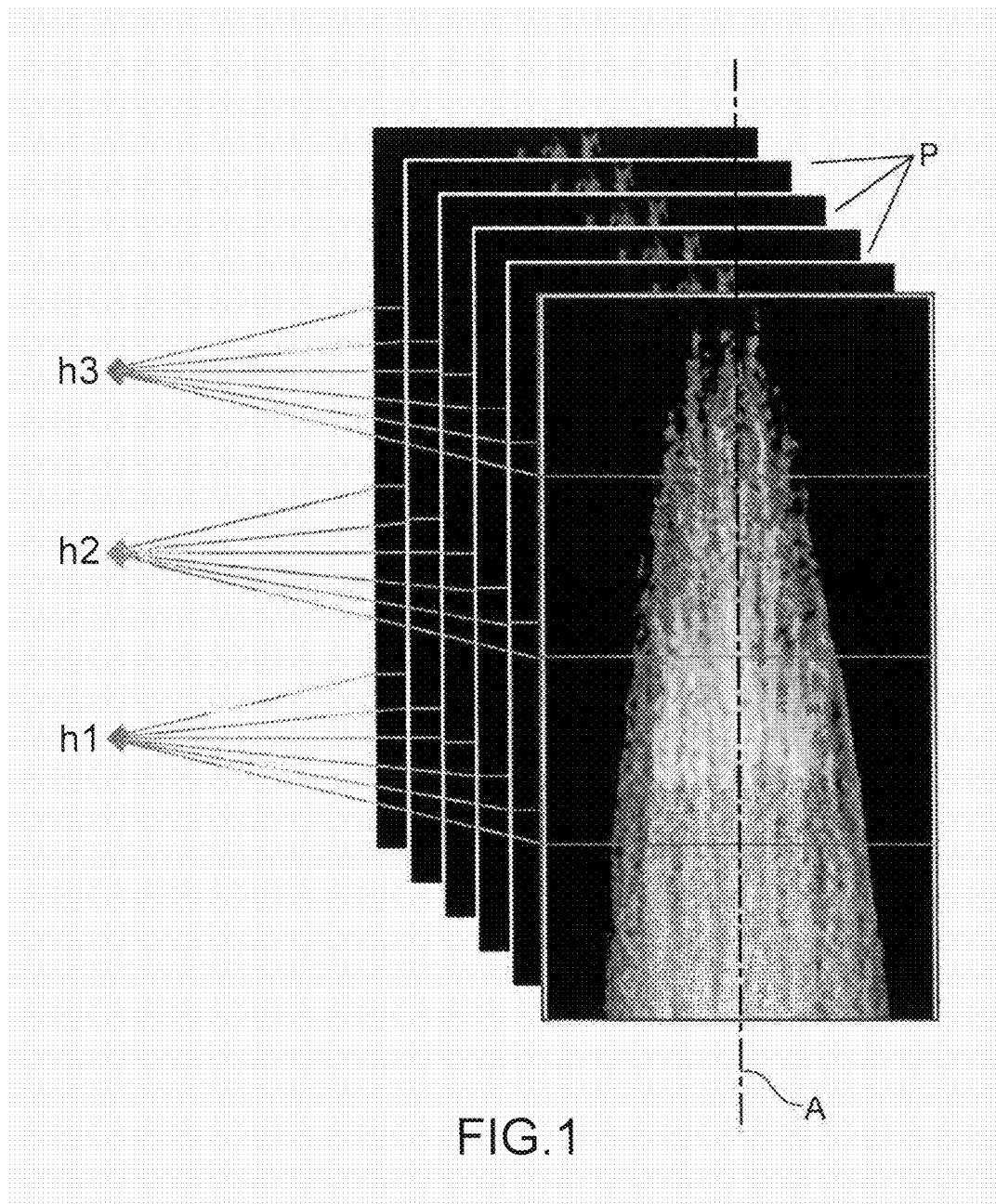
FIG. 1 is a view of several projections on which three groups of projection data located at different heights along the presumed rotation axis are diagrammatically shown, each group comprising a line, one group being located at a quarter of the height, one group being located at half the height and the last group being located at three-quarters of the height.

FIG. 1 shows a series of six projections P obtained for a sample E of porous silicon. The sample is preferably rotated by 180° and projections are taken at a pitch equal for example to between 0.5° and 1°.

The method preferably uses at least 180 projections.

The axis A is shown on the projections in FIG. 1, this is the presumed rotation axis initially considered by the reconstruction algorithms according to the state of the art and that is used for the first reconstruction that will be described.

The method of determining the real rotation axis or approaching the real rotation axis determines the offset between the presumed rotation axis and the real rotation axis at several positions along the axis A.

In FIG. 1, three positions have been chosen, which corresponds to the three heights h1, h2, h3 on the projections. The method uses projection data at each height h1, h2, h3. In FIG. 1, these data correspond to a line at each height. The data are actually pixels.

The heights may be chosen automatically, for example by searching zones of the image with no or little variation along the vertical axis.

Figure 2:
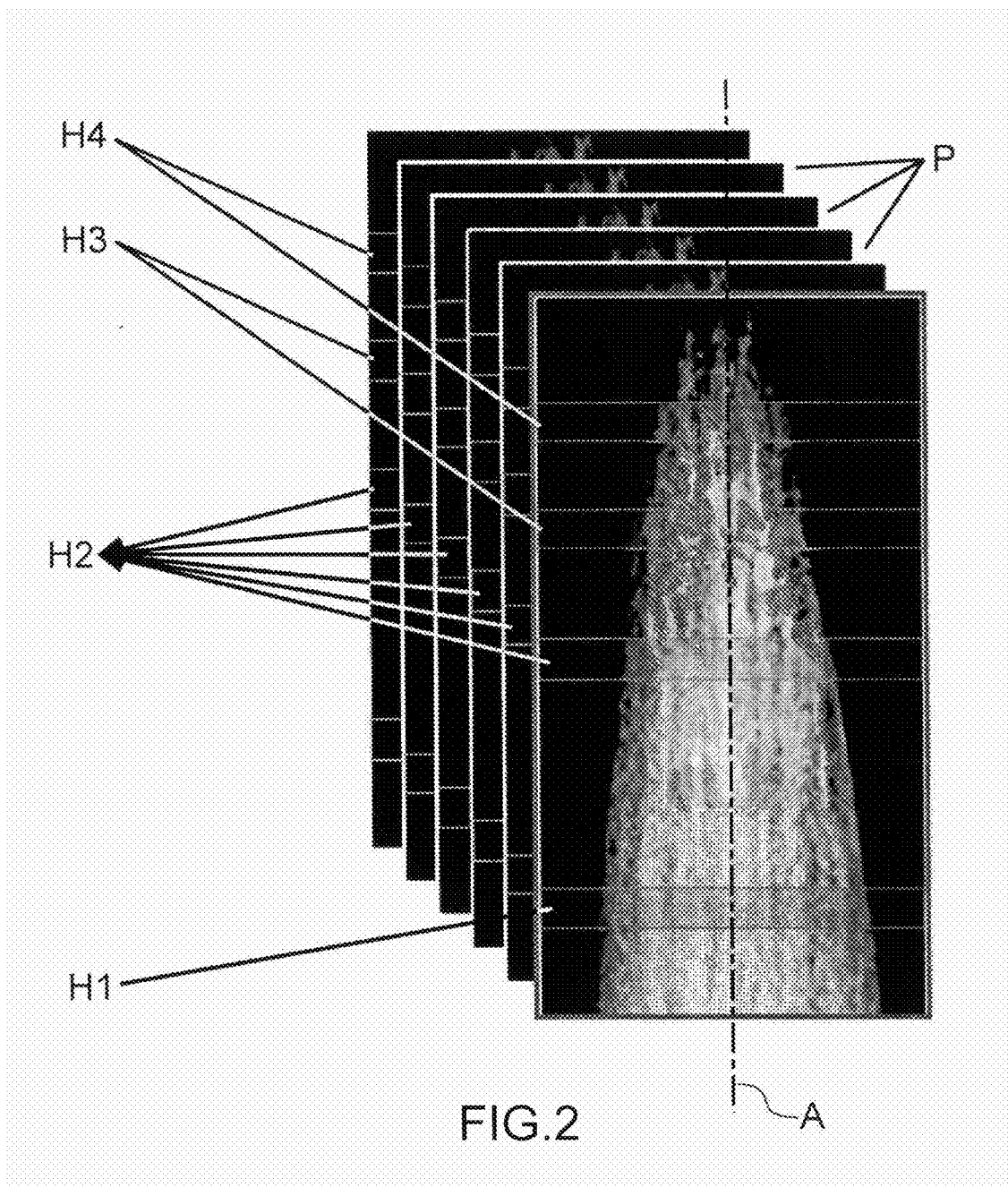
FIG. 2 is a view of several projections on which four groups of projection data located at different heights along the presumed rotation axis are diagrammatically shown, each group comprising several lines, the groups being located at arbitrary heights.

The same projections P can be seen in FIG. 2, but for which data have been selected at four different heights H1, H2, H3, H4. Moreover, the selected data correspond to several lines at each height.

Figure 3:
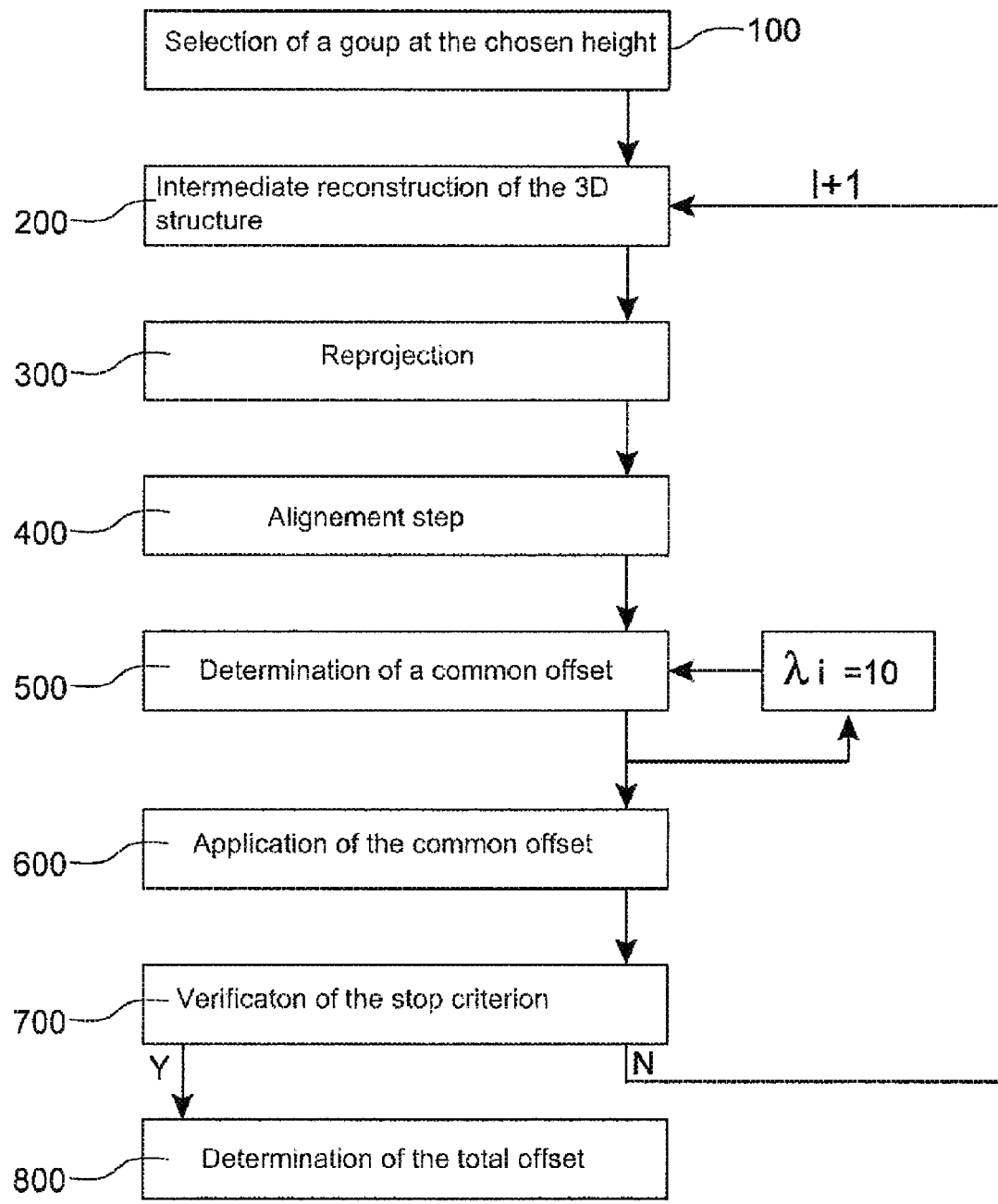
FIG. 3 is a flow chart representing the determination of the optimum common translation in pixels for a subgroup of projection data at a given projection height.

FIG. 3 shows a flow chart of steps in the method of determining the total offset or optimum common translation for a selected height.

Steps in the flow chart in FIG. 3 are repeated for each selected group of data. Then, knowing the optimum common translation at each height, the rotation axis can be determined for example by linear interpolation.

The method will now be described in detail.

Preferably, the translations between images are corrected before the optimum common translations are determined at different heights. This is made using a known technique, for example such as cross-correlations between successive projections, for example using the Inspect 3D software by FEI or "Common Line" techniques, the latter technique for example being described in the document by Brandt, S. S., & Frank, J. (2006). Markerless Alignment in Electron Tomography. In Electron Tomography (Second Ed., pp. 187-215).

A height h1 (FIG. 1) or H1 (FIG. 2) is then selected on all or some of the aligned projections.

In step 100, a group of data are selected at the chosen height. One data line is selected in FIG. 1, and several data lines are selected in FIG. 2.

During the next step 200, an intermediate reconstruction of the 3D structure is made from the data group at height h1 or H1. For example, a simultaneous iterative reconstruction technique (SIRT) may be used with 100 iterations and preferably with a positivity constraint, i.e. the reconstruction cannot have negative values. This reconstruction gives a very good compromise between reconstruction time and quality.

Other reconstruction types can be used as variants, for example we can use:
- a filtered retroprojection which has the advantage of being very fast;
- a Simultaneously Algebraic Reconstruction Technique (SART) that has the advantage of being faster than the SIRT method, however it is less robust in electron tomography;
- a reconstruction using a compressed sensing type algorithm or Total Variation Minimization (TVM) which gives very good reconstruction quality but is very long and requires a large number of parameters;
- a Discrete Algebraic Reconstruction Technique (DART) that also gives very good reconstruction quality but can only be applied to objects of which the composition and grey level values are known and it is relatively long.

Figure 6A:
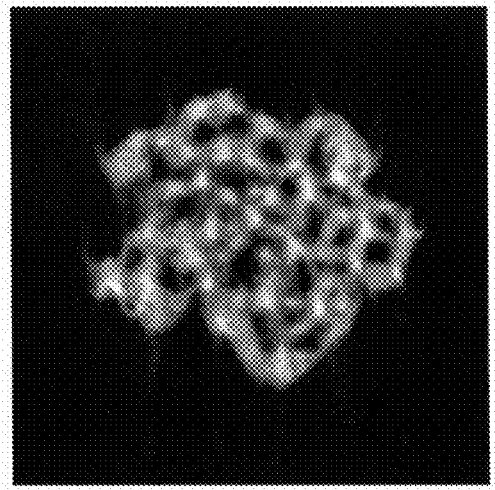
FIGS. 6A to 6E are intermediate reconstructions of the section of the porous silicon sample obtained during the method in FIG. 3.
Figure 6B:
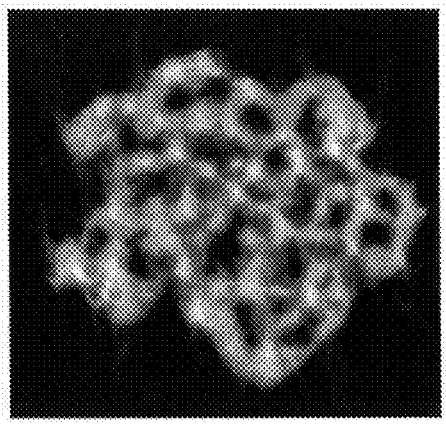
Figure 6C:
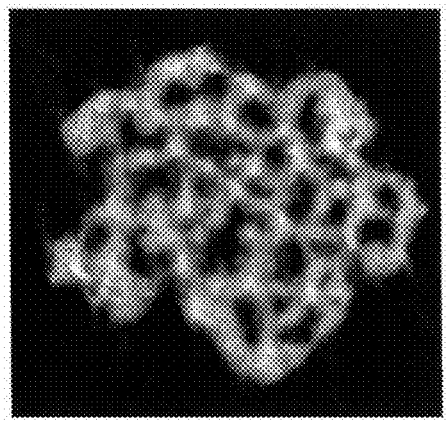
Figure 6D:
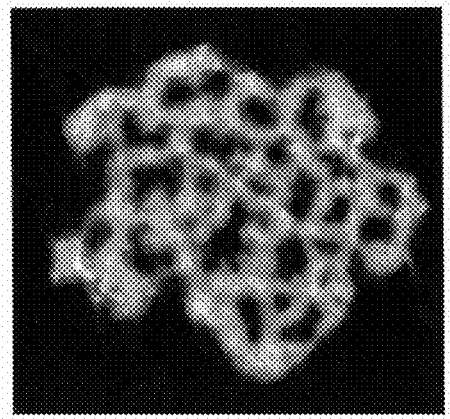
Figure 6E:
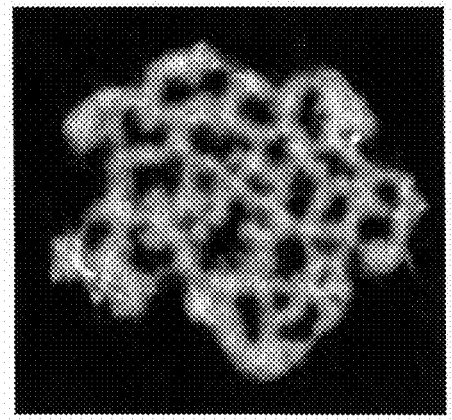

For example, a SIRT type reconstruction with 100 iterations and positivity constraint can be made from groups of 5 rows of 520 pixels on 180 projections, using the Matlab® software, to obtain the sectional view at a selected height shown in FIG. 6A. The reconstruction is made using the presumed rotation axis A-A'.

For example, the projector used to make the reconstruction is defined assuming that projections were obtained with a parallel 3D electron beam at angles α varying from 0 to 179 degrees with a step of 1 degree.

The reconstruction is made in a 520 pixels by 520 pixels by 5 pixels high block; one line in the data group contains 520 pixels and the group contains 5 lines.

During the next step 300, reprojections are made from the intermediate reconstruction. The projector used for reprojections is preferably identical to the projector used for the reconstruction in step 200, i.e. reprojections are made with the same angles as were used for the projections acquired using a microscope, these reprojections have the same size and the same number of pixels as the initial projections.

During the next step 400, an alignment step is carried out to determine the offset in pixels between each projection obtained using the microscope and the reprojection calculated in step 300. For example, the offset is determined by cross-correlation, for example using the Matlab® software dftregistration function. The offset may for example be given as a multiple value of $1/10^{th}$ pixels.

Advantageously, cross-correlation techniques can be improved by applying an image processing technique on projections and/or intermediate reconstruction and/or reprojections, for example a Sobel type filter can be applied that highlights the contours of an image.

As a variant, the use of an intermediate reconstruction element could be envisaged, as can be seen on projections for the alignment.

Figure 4:
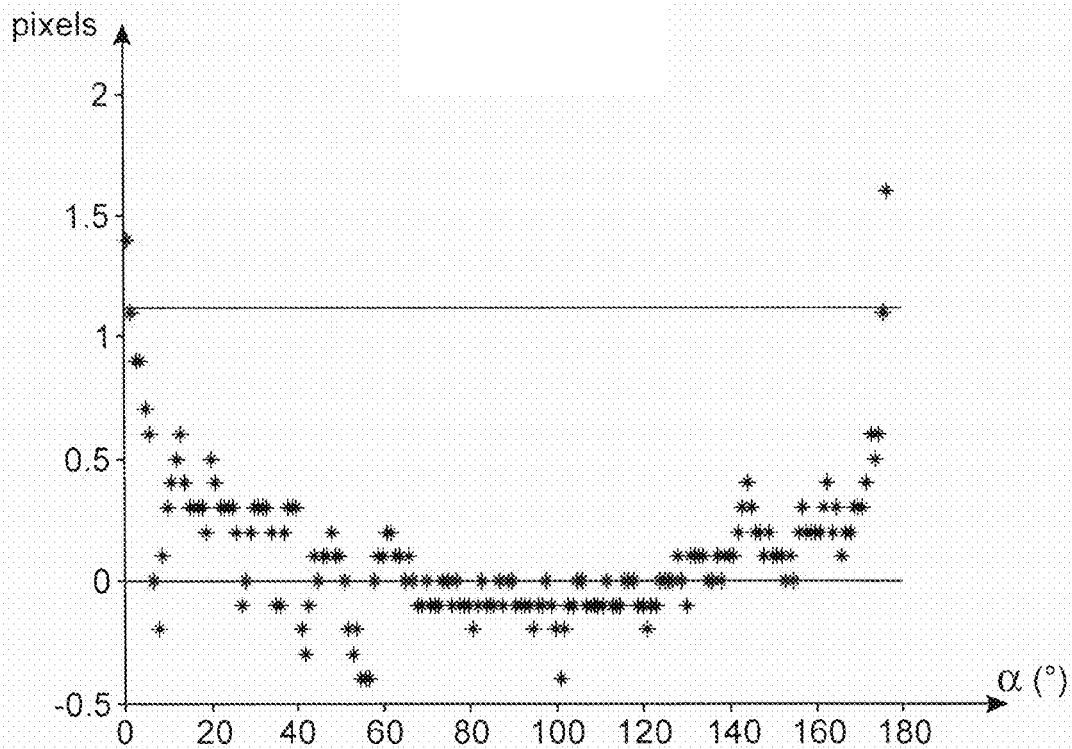
FIG. 4 is a graphic representation of offsets in pixels determined for each projection angle between the projections and reprojections.

Offsets in pixels measured between each projection and its associated reprojection can be seen in FIG. 4, as a function of projection angles.

The average offset DM is 0.12 pixels.

The next step 500 is to determine a common offset DC. This is made by calculating the mean offset DM between all projections. DC is equal to $\lambda \times DM$. In FIG. 4, $\lambda$ initial is chosen to be equal to 10 and is denoted $\lambda$ on the flowchart, but the value of $\lambda$ could be different. The choice of $\lambda > 1$ accelerates convergence. But it will be understood that $\lambda$ could be equal to 1, or even <1.

According to one advantageous variant, the average of the first and the last translations is calculated and forms the common offset directly.

The advantage of this variant is that it provides a large calculation time saving. Furthermore, the projection at −90° and the projection at +90° should be identical except for symmetry, in theory. If the rotation axis is not clearly defined, the projections at −90° and +90° will not be identical except for symmetry. Therefore, reconstruction will attempt to create an object that, when it is reprojected, gives approximately the two measured projections while attempting to obtain symmetric reprojections at −90° and +90°. The projections are then automatically offset by about the difference between the real rotation axis and the midpoint of the projections.

The remaining description of the method shows that this factor is modified.

During the next step 600, the common offset DC is applied to all projections acquired using the microscope.

The use of the average offset and its multiplication by a factor $\lambda$ enables fast convergence and gives some robustness.

As a variant, instead of calculating the average offset to obtain the common offset, the median offset can be calculated which can be interesting in the case in which several projections are very badly aligned. The median offset will ignore these projections.

A criterion for stopping determination of the offset has been previously defined, for example it is a given number of iterations I, for example I=20, or a value of the last applied common offset less than a given value, for example less than $10^{-3}$ pixels, the determination stopping when either of the two criteria is satisfied. This stop criterion is verified at step 700.

If the stop criterion Y is reached, the next step is to go on to step 800, during which the total offset is determined equal to the sum of all offsets for all iterations. This total offset is also denoted "Optimum Common Translation" or TCO.

As a variant, the stop criterion may be only the maximum number of iterations or only the lower limiting value of the common determined offset reached, the latter criterion being easy to apply and efficient. Also as another variant, the stop criterion could be stagnation of the improvement of reconstruction from one iteration to the next. This stagnation could be determined by estimating the distance between the projection and the corresponding reprojection, or by determining the reconstruction quality, etc.

Figure 5:
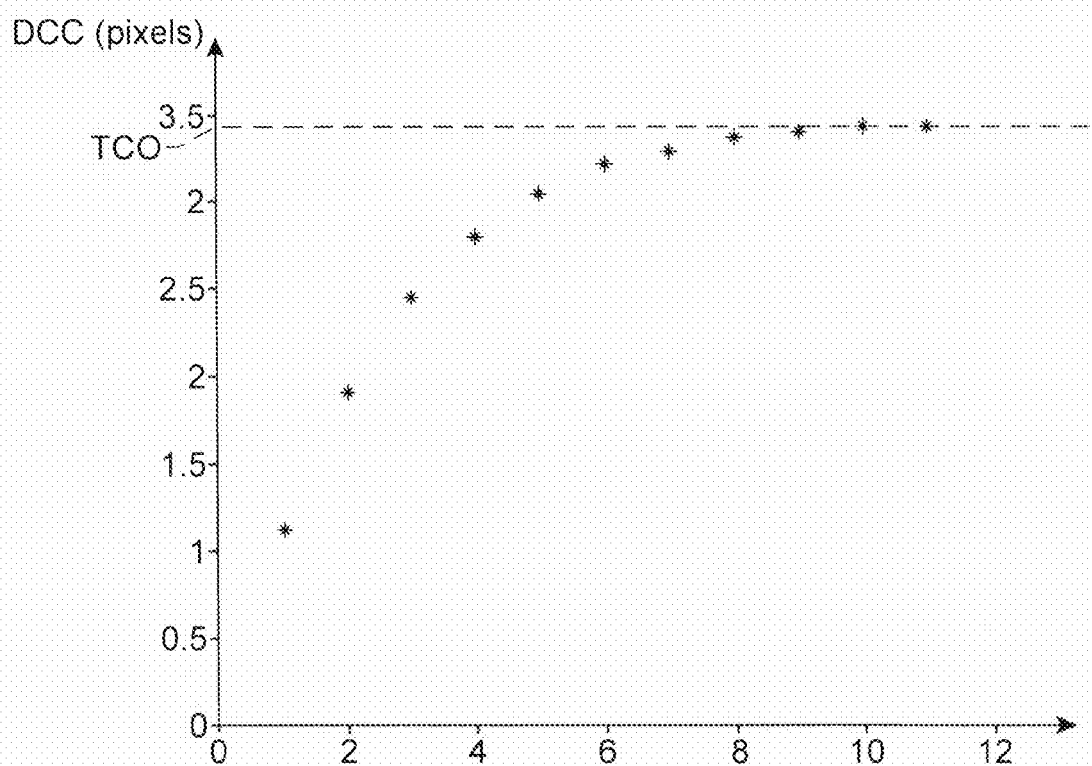
FIG. 5 is a graphic representation of the accumulated common offset in pixels as a function of the number of iterations.

FIG. 5 shows the graphic representation of the accumulated common offset DCC in pixels as a function of the number of iterations. The TCO is obtained after 11 iterations, the offset added between the $10^{th}$ iteration and the $11^{th}$ iteration being less than $10^{-3}$ pixels. The total offset is equal to 3.44 pixels.

If the stop criterion is not reached (N), then the method returns to step 200. This is iteration I+1, I≥0. A new reconstruction is made using the offset projections in step 500. The next step is to reproject this reconstruction in step 300.

The next step is to determine the offset between each offset projection and its related reprojection. The average offset is then applied and a common offset is calculated. If the sign of the offset determined in this iteration is not the same as the sign of the offset determined in the previous iteration, the coefficient λ is reduced, for example it is divided by 2, otherwise it can remain unchanged. This increases the stability of the method.

The offset projections, reconstruction, reprojections and offset determination steps may be done several times. FIGS. 6B, 6C, 6D and 6E show the intermediate reconstructions at iterations 2, 3, 8 and 11 respectively. It can be seen that the misalignment artefact is gradually reduced because the projection is offset progressively to approach the real rotation axis.

At the end of this method, we have determined the total offset at height h1 or H1 between the rotation axis A and the real rotation axis A'.

Steps 100 to 800 are repeated for the other selected data groups in order to determine the total offset at each height.

The method of determining the real rotation axis is obtained as follows starting from offsets at each height:

If the real rotation axis is perfectly vertical, optimum common translations determined at different heights are identical. If the real rotation axis and the presumed rotation axis are coincident, optimum common translations determined at different heights are equal to zero.

If the real rotation axis is tilted relative to the presumed rotation axis, the optimum common translations depend on the height according to a linear expression in the form $Tco(z)=\tan(\alpha) \times z + x0$; where a is the angle between the rotation axis A' and the vertical and x0 is the value of the optimum common translation at the mid-point of the complete 2D projections. A linear approximation starting from values of optimum common translations gives the values α and x0.

The next step is a linear interpolation to determine the rotation axis.

FIG. 8 shows a graphic representation of total offsets in pixels at seven different heights H (in pixels). In this representation, the zero height is assumed to be at the centre of the projection. FIG. 7 shows optimum common translations determined at each height and the real rotation axis obtained by linear interpolation, reproduced on a projection. As a variant, the optimum common translation(s) that is (are) too far from the approximately linear straight line may be ignored.

The offset between the assumed rotation axis and the real rotation axis is then considered to correct the 3D reconstruction.

For example, we can:
either translate and/or rotate each projection such that the vertical at the centre of the new projections is located on the axis determined by the interpolation.
In practice, it is sufficient to translate all projections by −x0, and then to rotate them by the angle −α using the mid-point of the images as the centre of rotation. The 3D object can then be reconstructed with conventional reconstruction algorithms that consider that the rotation axis is located at the centre of the projections and is oriented vertically;
or take account of the real rotation axis directly in the reconstruction algorithms.

Advantageously, we could envisage reducing the number of pixels in each group to accelerate the processing speed. For example, by dividing the number of pixels per line by two and the number of lines by two, the number of pixels in a data group is divided by four. The reduction factor of the number of pixels is used in the determination of optimum common translations in order to determine the tilt angle.

The size of projection subgroups may be reduced by conventional interpolation methods (linear, cubic, etc.) and it has the advantage that it reduces noise in projection subgroups.

The method of determining the real rotation axis according to the invention may advantageously be used to make fully automated software for tomography reconstruction.

The method according to the invention can be applied to electron tomography and X-ray tomography, both for material sciences or life sciences. The method may also be used in the medical field.

The invention claimed is:

1. A method of determining a rotation axis of an object during acquisition of projections obtained by a tomography characterization system, comprising the following steps, starting from said projections:
   a) choose a presumed rotation axis on the projections;
   b) select a first zone on the projections along the presumed rotation axis;
   c) reconstruct a structure of the object using data in the selected zone starting from all or some of the projections considering the presumed rotation axis;
   d) make reprojections of the reconstruction;
   e) determine offsets between the projections and reprojections;
   f) determine a common offset using the offsets determined in step e);
   g) apply the common offset to the selected zone over all or some of the projections;
   h) repeat steps c) to g), the reconstruction step c) being made from projections obtained in step d), until a stop criterion is reached;
   i) determine a total offset from the common offset(s) determined in step f) or steps f);
   j) repeat steps a) to i) for n other zones distinct from the first zone, where n is greater than or equal to 1;
   k) determine the rotation axis using total offsets determined for the n+1 zones, wherein the determined rotation axis is used in reconstruction of projections obtained by the tomography characterization system.

2. The method of determining a rotation axis according to claim 1, in which steps c) and d) are made using the same projector.

3. The method of determining a rotation axis according to claim 1, in which n is greater than or equal to 2 and is advantageously equal to 6.

4. The method of determining a rotation axis according to claim 1, in which step c) is made a simultaneous iterative reconstruction method.

5. The method of determining a rotation axis according to claim 1, in which step e) is made by cross-correlation.

6. The method of determining a rotation axis according to claim 1, in which step k) is made by linear extrapolation using total offsets.

7. The method of determining a rotation axis according to claim 1, in which the determination of a common offset comprises the step to determine a mean offset using offsets determined in step e), the common offset being equal to a coefficient λ multiplied by the mean offset, λ being strictly greater than 0.

8. The method of determining a rotation axis according to claim 7, in which the value of the coefficient k reduces during iterations.

9. The method of determining a rotation axis according to claim 1, in which the stop criterion is either:

only a number of iterations of steps c) to g);
only a value of the last common offset less than a given value;
either a number of iterations in steps c) to g) or a value of the last common offset less than a given value, whichever is reached first.

10. The method of determining a rotation axis according to claim 1, comprising the projection alignment step before the reconstruction step, for example by cross-correlation.

11. The method of determining a rotation axis according to claim 1, in which the selected zones comprise one or several rows of pixels.

12. A tomography characterisation method comprising the following steps:
A) Acquisition of several projections;
B) Determination of the real rotation axis of the object by applying the method according to claim 1;
C) Use the real rotation axis to reconstruct the structure of the object making use of a reconstruction algorithm.

13. The tomography characterisation method according to claim 12, in which step C) includes the correction of projections with the real rotation axis, before the reconstruction.

14. The tomography characterisation method according to claim 12, in which step C) includes integration of corrections into the reconstruction algorithm before the reconstruction.

15. The tomography characterisation method according to claim 12, in which step A) is made by electron tomography.

16. The tomography characterisation method according to claim 12, in which step A) is made by X-ray tomography.

17. The method of determining a rotation axis according to claim 4, in which step c) is made a simultaneous iterative reconstruction method comprising 100 iterations with a positivity constraint.

18. The method of determining a rotation axis according to claim 8, in which the value of the coefficient $\lambda$ reduces during iterations, the coefficient $\lambda$ being initially equal to 10.

19. The method of determining a rotation axis according to claim 10, comprising the projection alignment step before the reconstruction step by cross-correlation.

* * * * *